(12) United States Patent  
Kurita et al.

(10) Patent No.: US 7,073,483 B1
(45) Date of Patent: Jul. 11, 2006

(54) INTAKE AIR QUANTITY CONTROLLING DEVICE FOR INTERNAL COMBUSTION ENGINE

(75) Inventors: Kazuhisa Kurita, Tokyo (JP); Kenji Nakao, Tokyo (JP); Yoshihiko Onishi, Tokyo (JP); Takuya Uryu, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 11/144,824

(22) Filed: Jun. 6, 2005

(30) Foreign Application Priority Data

Mar. 17, 2005 (JP) ............................. 2005-077093

(51) Int. Cl.
*F02D 9/08* (2006.01)
*F16K 1/22* (2006.01)
(52) U.S. Cl. ..................................... 123/337
(58) Field of Classification Search ............... 123/399, 123/337, 396; 251/305
See application file for complete search history.

(56) References Cited

U.S. PATENT DOCUMENTS

| | | | | |
|---|---|---|---|---|
| 6,032,647 A * | 3/2000 | Sato et al. | ................... | 123/399 |
| 6,050,241 A * | 4/2000 | Reiling | ........................ | 123/396 |
| 6,138,640 A * | 10/2000 | Asanuma et al. | ........... | 123/337 |
| 6,155,533 A * | 12/2000 | Semeyn et al. | ........ | 251/129.12 |
| 6,189,507 B1 * | 2/2001 | Tsuchiya et al. | ............ | 123/399 |
| 6,286,481 B1 * | 9/2001 | Bos et al. | ................... | 123/399 |
| 6,347,613 B1 * | 2/2002 | Rauch | ........................ | 123/337 |
| 6,386,178 B1 * | 5/2002 | Rauch | ........................ | 123/337 |
| 6,397,815 B1 * | 6/2002 | von Werder | ................ | 123/396 |
| 6,488,009 B1 * | 12/2002 | Sakurai et al. | .............. | 123/399 |
| 6,502,542 B1 * | 1/2003 | Stuart | ......................... | 123/337 |
| 6,575,427 B1 * | 6/2003 | Rauch et al. | .................. | 251/69 |
| 6,672,564 B1 * | 1/2004 | Johann et al. | .............. | 251/286 |
| 6,739,312 B1 * | 5/2004 | Komeda et al. | ............ | 123/337 |
| 6,739,315 B1 * | 5/2004 | Kurita et al. | ............... | 123/399 |
| 6,763,805 B1 * | 7/2004 | Tokiya et al. | ............... | 123/399 |
| 6,834,639 B1 * | 12/2004 | Torii | .......................... | 123/396 |
| 6,918,374 B1 * | 7/2005 | Kurita et al. | ............... | 123/396 |
| 2005/0022785 A1 | 2/2005 | Kurita et al. | | |

FOREIGN PATENT DOCUMENTS

| | | |
|---|---|---|
| DE | 196 12 869 A1 | 10/1997 |
| DE | 100 26 471 A1 | 12/2002 |
| JP | 11-173166 A | 6/1999 |
| JP | 2003-120335 A | 4/2003 |

\* cited by examiner

*Primary Examiner*—Hai Huynh
(74) *Attorney, Agent, or Firm*—Sughrue Mion, PLLC

(57) ABSTRACT

An intake air quantity controlling device for an internal combustion engine that includes a shaft, a throttle valve, a final spur gear, a drive motor, a full closure stopper, a full opening stopper, and a collision portion. The shaft is rotatably provided across an intake passage. The throttle valve is fixed to the shaft. The final spur gear is fixed to an end portion of the shaft. The drive motor applies a rotational force to the final spur gear. A full closure stopper determines a full closure position of the throttle valve, and full opening stopper determines a full opening position of the throttle valve. The final spur gear is provided with the collision portion, which collides with the full closure stopper and the full opening stopper to stop rotation of the final spur gear. The collision portion has a notch portion formed therein, defining a full-closure-side collision member that is elastically deformed through collision with the full closure stopper and a full-opening-side collision member that is elastically deformed through collision with the full opening stopper.

7 Claims, 4 Drawing Sheets

US 7,073,483 B1

INTAKE AIR QUANTITY CONTROLLING DEVICE FOR INTERNAL COMBUSTION ENGINE

BACKGROUND OF THE INVENTION

1. Field of the Invention

The present invention relates to an intake air quantity controlling device for an internal combustion engine in which a collision portion of a driven-side gear collides with a full closure stopper and a full opening stopper, which are formed in a body, so that the driven-side gear stops rotating.

2. Description of the Related Art

In a conventionally known intake air quantity controlling device for an internal combustion engine which absorbs a collision load applied at the time when a driven-side gear collides with a full closure stopper or a full opening stopper, a driving-side gear and the driven-side gear are constructed as helical gears, one of which is coupled to a rotary shaft so as to be movable in a thrust direction with a cushioning member provided therebetween, as disclosed in JP 11-173166 A (FIGS. 1 and 2).

In the case of this intake air quantity controlling device, even when the driven-side gear hits the full closure stopper or the full opening stopper and stops all of a sudden, one of the gears moves in the thrust direction and the cushioning member absorbs a collision load applied at that moment.

In another known intake air quantity controlling device for an internal combustion engine, a collision portion colliding with a full closure stopper and a collision portion colliding with a full opening stopper are separately formed, as disclosed in JP 2003-120335 A.

However, in the aforementioned intake air quantity controlling device disclosed in JP 11-173166 A (FIGS. 1 and 2), the structurally complicated and costly helical gears must be used, and the cushioning member for causing the gear to slide with respect to the rotary shaft must be provided between the gear and the rotary shaft. There are problems in that the number of required parts increases accordingly, that the gear may not smoothly slide, and that the operation of mounting the cushioning member is bothersome.

In the aforementioned intake air quantity controlling device disclosed in JP 2003-120335 A, the costly helical gears are dispensable, and the cushioning member for causing the gear to slide with respect to the rotary shaft is unnecessary. However, since the collision portions are separately formed, problems of structural complication and volume augmentation are caused.

SUMMARY OF THE INVENTION

The present invention has been made to solve the problems as stated above, and therefore it is an object of the present invention to provide an intake air quantity controlling device for an internal combustion engine which makes it possible to absorb a collision load applied at the time when a driven-side gear hits a full closure stopper or a full opening stopper with a simple construction and without entailing an increase in volume.

An intake air quantity controlling device for an internal combustion engine according to the present invention includes: a body having an intake passage; a shaft rotatably provided across the intake passage; a throttle valve fixed to the shaft; a driven-side gear fixed to an end portion of the shaft; a drive motor that applies a rotational force to the driven-side gear; a full closure stopper that is provided in the body and determines a full closure position of the throttle valve; a full opening stopper that is provided in the body and determines a full opening position of the throttle valve; and a collision portion that is provided in the driven-side gear, and collides with the full closure stopper or the full opening stopper to stop rotation of the driven-side gear. The collision portion has a notch portion, and a full-closure-side collision member and a full-opening-side collision member that are defined by the notch portion, the full-closure-side collision member being elastically deformed through collision with the full closure stopper, the full-opening-side collision member being elastically deformed through collision with the full opening stopper.

The intake air quantity controlling device for the internal combustion engine according to the present invention absorbs a collision load applied at the time when the driven-side gear hits the full closure stopper or the full opening stopper, with a simple construction and without entailing an increase in volume.

DETAILED DESCRIPTION OF THE PREFERRED EMBODIMENT

First Embodiment

An intake air quantity controlling device for an internal combustion engine (hereinafter referred to as the intake air quantity controlling device) according to a first embodiment of the present invention will be described hereinafter based on the drawings.

Figure 1:
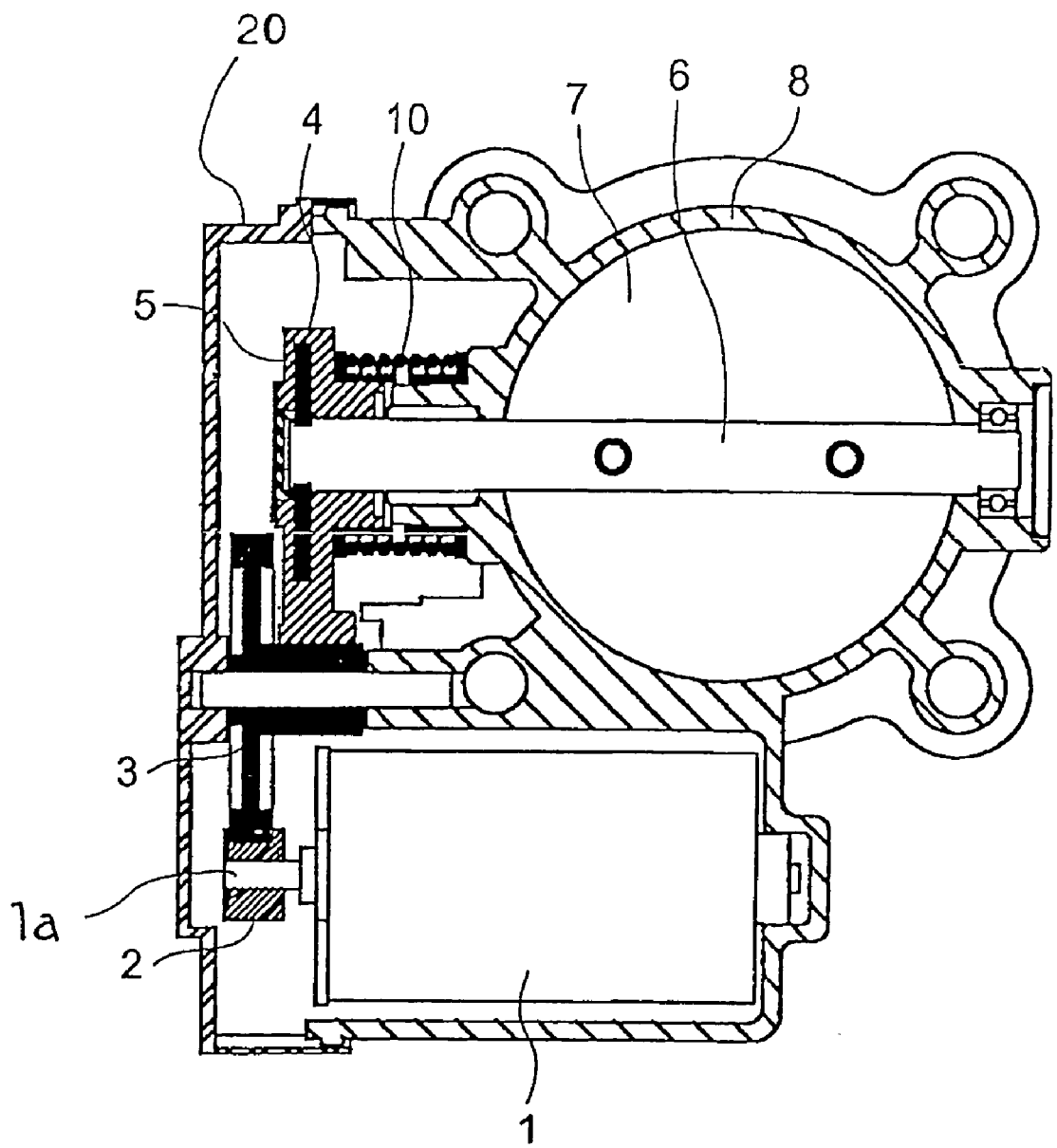
FIG. 1 is a side sectional view of an intake air quantity controlling device for an internal combustion engine according to a first embodiment of the present invention.
Figure 2:
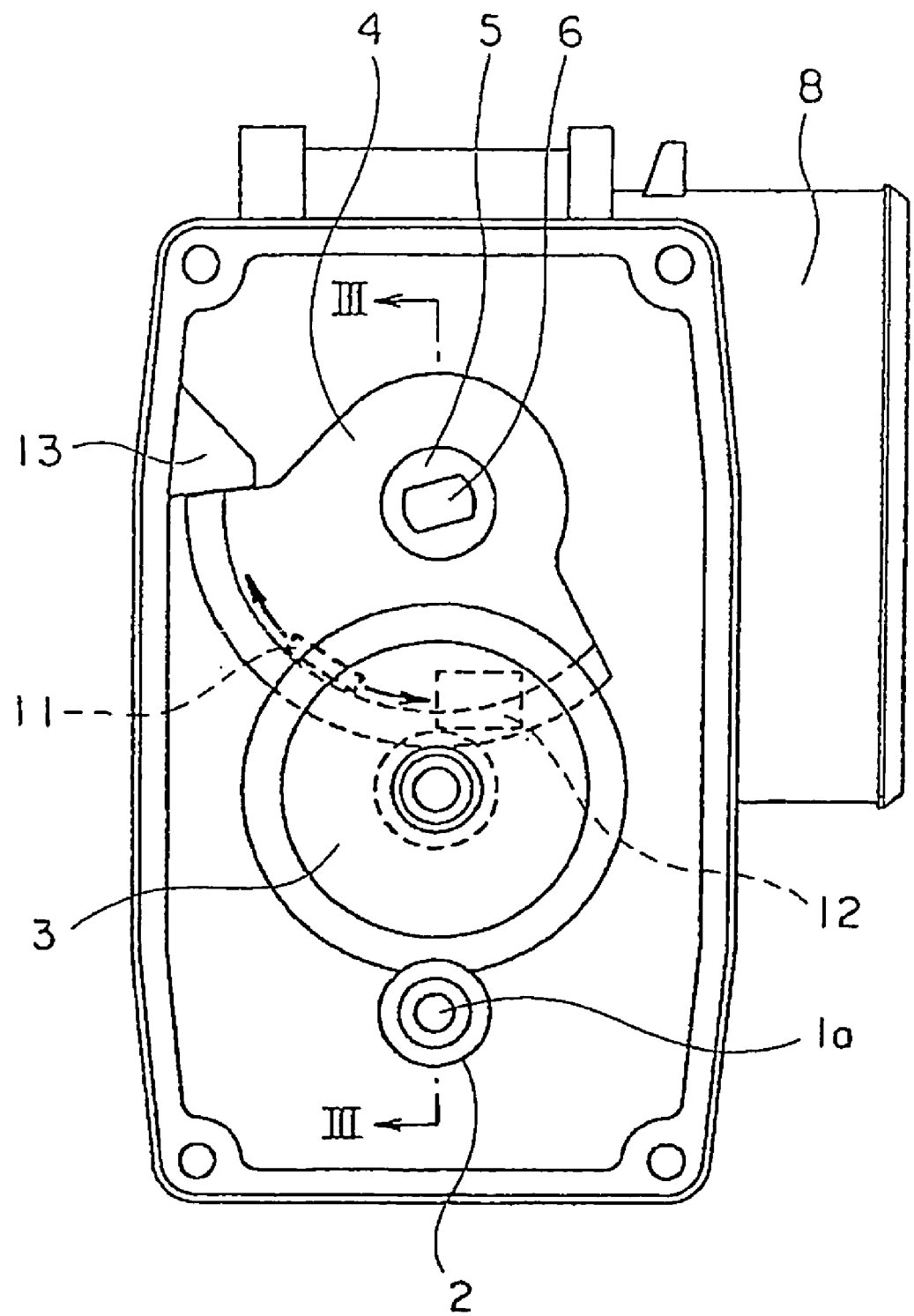
FIG. 2 is a left side view of the intake air quantity controlling device for the internal combustion engine, with a cover of FIG. 1 removed.

FIG. 1 is a side sectional view of this intake air quantity controlling device. FIG. 2 is a left side view of the intake air quantity controlling device, with a cover 20 of FIG. 1 removed.

In this intake air quantity controlling device, a motor spur gear 2 as a driving-side gear is fixed to an output shaft 1a of a drive motor 1 that is driven by a direct current. An intermediate spur gear 3 made of a resin meshes with the motor spur gear 2. A fan-shaped final spur gear 4 meshes with the intermediate spur gear 3.

The final spur gear 4 as a driven-side gear is fixed to an end portion of a shaft 6, which is rotatable with respect to a body 8 in which an intake passage is formed. A throttle valve 7, which adjusts a flow rate of air flowing in the intake passage, is screwed on the shaft 6. A coiled return spring 10 for effecting a return to an initial position at the time when the internal combustion engine is at an idling rotational speed is provided on an outer periphery of the shaft 6 on the final spur gear 4 side.

Figure 3:
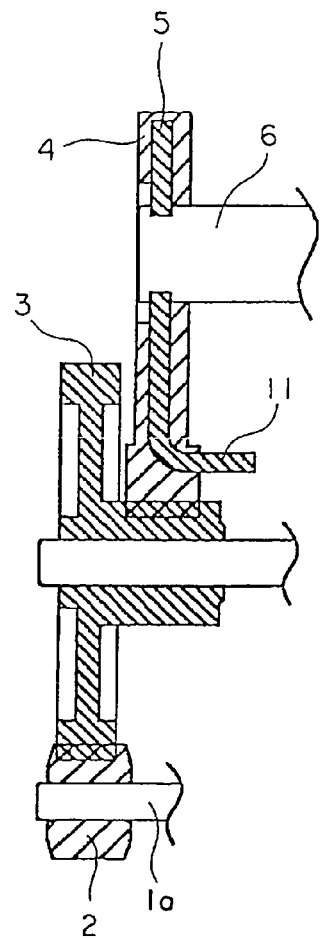
FIG. 3 is a sectional view taken along arrows III—III of FIG. 2.
Figure 4:
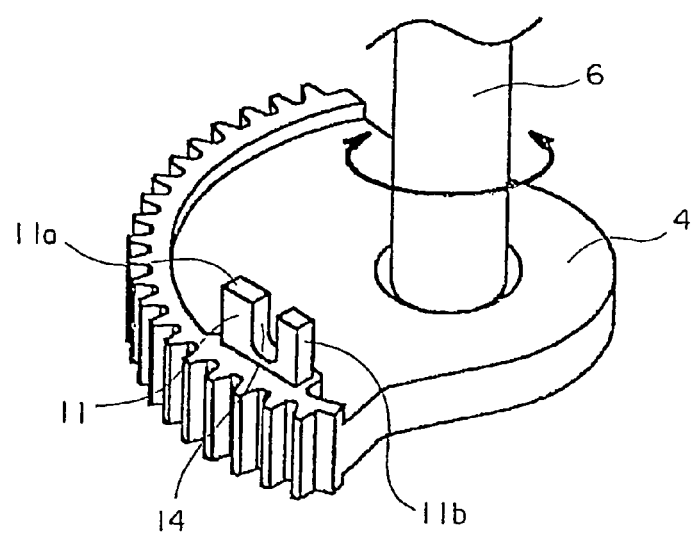
FIG. 4 is a perspective view of a final spur gear of FIG. 2.

FIG. 3 is a sectional view taken along arrows III—III of FIG. 2. FIG. 4 is a perspective view of the final spur gear 4 of FIG. 2.

The final spur gear 4 is integrated with a metal plate 5 by insert resin molding. A collision portion 11 is formed by a part of an outer peripheral edge portion of the plate 5 which projects toward the throttle valve 7 and in parallel to the shaft 6. The collision portion 11 collides with a full closure stopper 12 and a full opening stopper 13, which project inward from an inner wall surface of the body 8.

The collision portion 11 has a full-closure-side collision member 11a and a full-opening-side collision member 11b, which are separated from each other by a notch portion 14 having a U-shaped notched end face.

Figure 5:
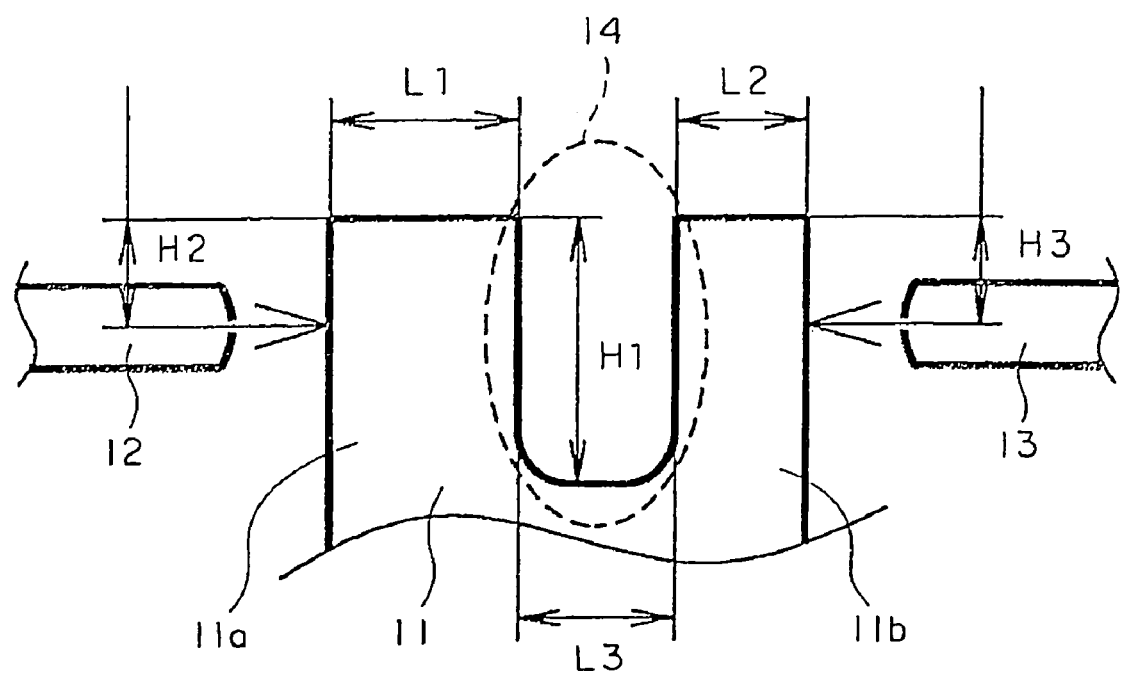
FIG. 5 is a diagram for explaining the relationship between a notch portion of a collision portion and collision positions where the collision portion collides with a full closure stopper and a full opening stopper.

As shown in FIG. 5, a height H1 of the notch portion 14 is greater than a height H2 of a collision position where the collision portion 11 collides with the full closure stopper 12 and a height H3 of a collision position where the collision portion 11 collides with the full opening stopper 13.

A load applied to the collision portion 11 at the time of a collision with the full closure stopper 12 or the full opening stopper 13 is mainly received by the full-closure-side collision member 11a when the throttle valve 7 is fully closed, and is mainly received by the full-opening-side collision member 11b when the throttle valve 7 is fully open. In many cases, however, the collision load value differs depending on whether the throttle valve 7 is fully closed or fully open.

As regards the difference in collision load, elastic deformation amounts of the full-closure-side collision member 11a and the full-opening-side collision member 11b can be adjusted to be within predetermined ranges respectively by adjusting a width dimension L1 of the full-closure-side collision member 11a and a width dimension L2 of the full-opening-side collision member 11b.

If the elastic deformation amount of the full-closure-side collision member 11a is set too large, the throttle valve 7 rotates counterclockwise in FIG. 2 beyond a position where it must collide with the full closure stopper 12 and stop, and may into an inner wall of the intake passage of the body 8 (the full closure position of the throttle valve 7 is usually set to a position where the throttle valve 7 is slightly spaced from a contact position with the inner wall of the intake passage, in order to prevent the throttle valve 7 from sinking into the inner wall of the intake passage).

Accordingly, it is particularly necessary to set the height H1 and a width L3 of the notch portion 14, the width L1 of the full-closure-side collision member 11a, and the width L2 of the full-opening-side collision member 11b such that the throttle valve 7 is in collision with the full closure stopper 12 but not in contact with the inner wall of the intake passage of the body 8 and that the full-closure-side collision member 11a is not plastically deformed due to an impact load.

In the intake air quantity controlling device of the above-mentioned construction, when a driver depresses an accelerator pedal, an accelerator opening degree signal is inputted to an ECU from an accelerator opening degree sensor (not shown). The ECU energizes the drive motor 1 such that the throttle valve 7 assumes a predetermined opening degree, whereby the output shaft 1a of the drive motor 1 rotates. Owing to rotation of the output shaft 1a, the motor spur gear 2, the intermediate spur gear 3, and the final spur gear 4 rotate. Thus, the shaft 6 integrated with the final spur gear 4 rotates by a predetermined rotation angle, and the throttle valve 7 is held at the predetermined rotation angle in the intake passage formed in the body 8.

When the throttle valve 7 is fully open, the collision position 11 of the plate 5 collides with the full opening stopper 13 and the throttle valve 7 stops turning. Since the notch portion 14 is formed in the collision portion 11, an impact load at that moment is absorbed especially through great elastic deformation of the full-opening-side collision member 11b. Thus, respective flanks of the final spur gear 4 and the intermediate spur gear 3 are prevented from being damaged due to concentration of stresses thereon resulting from, for example, collision of the collision portion 11.

When the throttle valve 7 is fully closed, the collision portion 11 of the plate 5 collides with the full closure stopper 12 and the throttle valve 7 stops turning. At this moment as well, as in the case where the throttle valve 7 is fully open, an impact load is absorbed especially through great elastic deformation of the full-closure-side collision member 11a, and the respective flanks of the final spur gear 4 and the intermediate spur gear 3 are prevented from being damaged.

As described above, according to the intake air quantity controlling device of the present invention, the notch portion 14 is formed in the collision portion 11 having the full-closure-side collision member 11a that is elastically deformed through collision with the full closure stopper 12 and the full-opening-side collision member 11b that is elastically deformed through collision with the full opening stopper 13. Therefore, a collision load applied at the time when the final spur gear 4 hits the full closure stopper 12 or the full opening stopper 13 is reliably absorbed. Thus, the respective flanks of the final spur gear 4 and the intermediate spur gear 3 are prevented from being damaged due to concentration of stresses thereon resulting from, for example, collision of the collision portion 11.

The collision portion 11 is easily formed simply by projecting and bending the edge portion of the plate 5.

With the distal end face of the collision portion 11 taken as a reference, the height H1 of the notch portion 14 is greater than the height H2 of the collision position where the collision portion 11 collides with the full closure stopper 12 and the height H3 of the collision position where the collision portion 11 collides with the full opening stopper 13. Therefore, the full-closure-side collision member 11a and the full-opening-side collision member 11b are elastically deformed with reliability through collision of the collision portion 11, and a collision load is reliably absorbed.

The amount of elastic deformation of the collision portion 11 is set by adjusting the height H1 and the width L3 of the notch portion 14, the width L1 of the full-closure-side collision member 11a, and the width L2 of the full-opening-side collision member 11b. Thus, even when the collision load value differs depending on whether the throttle valve 7 is fully closed or fully open, an optimal elastic deformation amount can be set easily.

What is claimed is:

1. An intake air quantity controlling device for an internal combustion engine, the device comprising:

a body having an intake passage;

a shaft rotatably provided across the intake passage;

a throttle valve fixed to the shaft;

a driven-side gear fixed to an end portion of the shaft;

a drive motor that applies a rotational force to the driven-side gear;

a full closure stopper that is provided in the body and determines a full closure position of the throttle valve;

a full opening stopper that is provided in the body and determines a full opening position of the throttle valve; and a collision portion that is provided in the driven-side gear, and collides with the full closure stopper or the full opening stopper to stop rotation of the driven-side gear, wherein the collision portion has a notch portion, and a full-closure-side collision member and a full-opening-side collision member that are defined by the notch portion, the full-closure-side collision member being elastically deformed through collision with the full closure stopper, the full-opening-side collision member being elastically deformed through collision with the full opening stopper.

2. An intake air quantity controlling device for an internal combustion engine according to claim 1, wherein the driven-side gear is a final spur gear formed by subjecting a metal plate to insert resin molding, and wherein the collision portion is constructed by projecting and bending an edge portion of the plate.

3. An intake air quantity controlling device for an internal combustion engine according to claim 1, wherein with reference to a distal end face of the collision portion, a height of the notch portion is greater than a height of a collision position where the collision portion collides with the full closure stopper and a height of a collision position where the collision portion collides with the full opening stopper.

4. An intake air quantity controlling device for an internal combustion engine according to claim 1, wherein an elastic deformation amount of the collision portion is set by adjusting a height and a width of the notch portion, a width of the full-closure-side collision member, and a width of the full-opening-side collision member.

5. An intake air quantity controlling device for an internal combustion engine according to claim 1, wherein the collision portion is oriented coaxially with the shaft.

6. An intake air quantity controlling device for an internal combustion engine according to claim 1, wherein the full closure stopper and the full open stopper are separate and disposed at different circumferential positions with respect to an axis of rotation of the shaft.

7. An intake air quantity controlling device for an internal combustion engine according to claim 1, wherein the collision member extends orthogonally from a planar surface of the driven-side gear.

* * * * *